(12) United States Patent
McClelland et al.

(10) Patent No.: US 6,821,476 B2
(45) Date of Patent: Nov. 23, 2004

(54) GAS ASSISTED INJECTION MOULDING

(75) Inventors: Alan Nigel McClelland, Tervuren (BE); Ajay Devidas Padsalgikar, Hamilton (GB)

(73) Assignee: Huntsman International LLC, Salt Lake City, UT (US)

( * ) Notice: Subject to any disclaimer, the term of this patent is extended or adjusted under 35 U.S.C. 154(b) by 100 days.

(21) Appl. No.: 10/178,547

(22) Filed: Jun. 24, 2002

(65) Prior Publication Data

US 2003/0015815 A1 Jan. 23, 2003

Related U.S. Application Data

(63) Continuation of application No. PCT/EP00/13147, filed on Dec. 22, 2001.

(51) Int. Cl.$^7$ .............................................. B29C 44/02
(52) U.S. Cl. ........................... 264/572; 264/51; 264/53; 264/DIG. 6
(58) Field of Search ............................. 264/53, DIG. 6, 264/40.3, 51, 572

(56) References Cited

U.S. PATENT DOCUMENTS

| | | | | |
|---|---|---|---|---|
| 4,208,368 A | * | 6/1980 | Egli | 264/45.5 |
| 5,260,343 A | * | 11/1993 | Harrison et al. | 521/51 |
| 5,798,063 A | * | 8/1998 | Bender et al. | 264/45.5 |
| 5,945,048 A | * | 8/1999 | Ensinger | 264/46.1 |
| 5,948,347 A | * | 9/1999 | van Jaarsveld et al. | 264/572 |

FOREIGN PATENT DOCUMENTS

| | | |
|---|---|---|
| DE | 40 17 517 | 12/1991 |
| EP | 0 158 212 | 10/1985 |
| EP | 0 211 250 | 2/1987 |
| EP | 0 467 565 | 1/1992 |
| EP | 0 640 456 | 3/1995 |
| EP | 0 648 157 | 4/1995 |
| EP | 0 692 516 | 1/1996 |
| WO | WO 00 44821 | 8/2000 |

\* cited by examiner

*Primary Examiner*—Allan R. Kuhns
(74) *Attorney, Agent, or Firm*—Nicole Graham

(57) ABSTRACT

Manufacture of molded polyurethane or molded polyurethane containing products, especially thermoplastic products, such as elastomers, flexible foam, and rigid foam using gas assisted injection molding. Preferred polyurethane products are thermoplastic polyurethanes.

9 Claims, 1 Drawing Sheet

1. Closing the mould and built up counter pressure

2. Injection into the cavity under counter-pressure

3. Pressure relief and foaming

4. Open the mould and ejection

1. Closing the mould and built up counter pressure

2. Injection into the cavity under counter-pressure

3. Pressure relief and foaming

4. Open the mould and ejection

GAS ASSISTED INJECTION MOULDING

CROSS REFERENCE TO RELATED APPLICATIONS

This application is a continuation of international application PCT EP00/13147, filed Dec. 22, 2000.

FIELD OF THE INVENTION

This invention relates to the manufacture of moulded polyurethane (or moulded polyurethane containing products), especially thermoplastic products such as elastomers, flexible foam, and rigid foam using gas assisted injection moulding (herein after referred to as "GAIM").

BACKGROUND OF THE INVENTION

Thermoplastic polyurethanes (herein after referred to as "TPUs" or "TPU") are well-known thermoplastic elastomers. TPUs exhibit very high tensile and tear strength, high flexibility at low temperatures, and extremely good abrasion and scratch resistance. TPUs also have a high stability against oil, fats and many solvents, as well as stability against UV radiation. Because of these desirable features, TPUs are employed in a number of end use applications, such as in the automotive and the footwear industries.

Because many of the end use applications require that the TPU be light (i.e. have a low density), there is always a demand for lighter TPUs. Developing such low density TPUs presents many technical challenges because the desirable physical properties of TPUs are often sacrificed in order to reach this lower density.

It is already known to produce soles and other polyurethane parts by a poly-addition reaction of liquid reactants resulting in an elastic solid moulded body. The reactants used are polyisocyanates and polyesters or polyethers containing OH-groups. Foaming is affected by adding a liquid of low boiling point or by means of $CO_2$, thereby obtaining foam with at least partially open cells. Reducing the weight of the materials by foaming the TPU has not given satisfactory results.

Attempts to foam TPU using well-known blowing agents, such as azodicarbonamides (exothermic) or sodiumhydrocarbonate (endothermic) based products were not successful for mouldings with reduced densities below 800 $kg/m^3$. With endothermic blowing agents, a good surface finish can be obtained but the lowest density achievable is about 800 $kg/m^3$. Also, the processing is not very consistent and results in long demoulding times. Very little or no foaming is obtained at the mould surface due to a relatively low mould temperature, resulting in a compact, rather thick skin and a coarse cell core. By using exothermic blowing agents, a lower density foam (down to 750 $kg/m^3$) with very fine cell structure can be achieved, but the surface finish is not acceptable for most applications and demould time is even longer.

Therefore, it is clear that there is a continuous demand for low density TPUs that have improved skin quality and can be produced with reduced demould times.

SUMMARY OF THE INVENTION

Therefore, it is an object of the present invention to provide low density TPUs that have improved skin quality and can be produced with reduced demould times.

It has been surprisingly found that moulded polyurethane containing products that are manufactured using gas assisted injection moulding meet the above objectives. Demould times are significantly reduced and the process can be carried out at lower temperatures, resulting in a better barrel stability. In addition, further density reduction is obtained while maintaining or improving the skin quality and demould time. The low density thermoplastic polyurethanes thus obtained (density not more than 800 $kg/m^3$) have a fine cell structure, a uniform density profile, very good surface appearance, a skin having uniform thickness and show comparable physical properties to conventional PU which renders them suitable for a wide variety of applications.

Particularly, the invention provides TPU products having outstanding low temperature dynamic flex properties and green strength at the time of demould, at density 800 $kg/m^3$ and below. The term "green strength", as is known in the art, denotes the basic integrity and strength of the TPU at demould. The polymer skin of a moulded item, for example, a shoe sole and other moulded articles, should possess sufficient tensile strength and elongation and tear strength to survive a 90 to 180 degree bend without exhibiting surface cracks. The prior art processes often require 5 minutes minimum demould time to attain this characteristic. The present invention provides a significant improvement in minimum demould time, as a demould time of 2 to 3 minutes is achievable.

There is different equipment capable of pressurising a gas such that it may be injected into a moulding process. Examples are cited in EP 467 565 and EP 648 157. However, none of these have been successfully implemented for the manufacturing of moulded polyurethane, especially thermoplastic products.

In one embodiment, the present invention relates to a process for making moulded thermoplastic polyurethane products using gas assisted injection moulding. According to another embodiment, a process for making moulded polyurethane products is provided by using a gas counter pressure together with the gas injection moulding. According to yet another embodiment, a process for making moulded polyurethane products is provided by using gas assisted injection moulding in the presence of expandable microspheres.

DETAILED DESCRIPTION OF THE INVENTION

Figure 1:
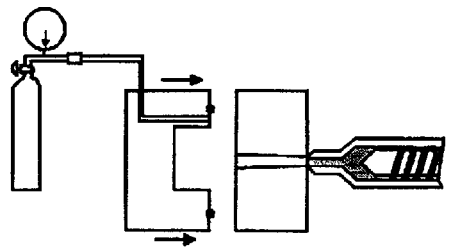
FIG. 1 shows the steps of an injection moulding cycle using the counter-pressure process.
Figure 1:
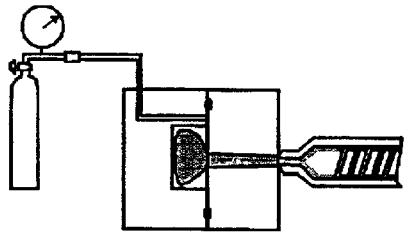
Figure 1:
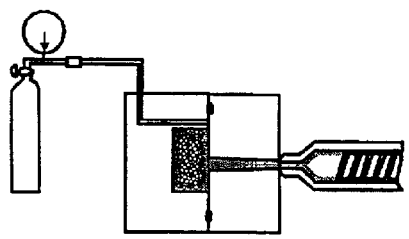
Figure 1:
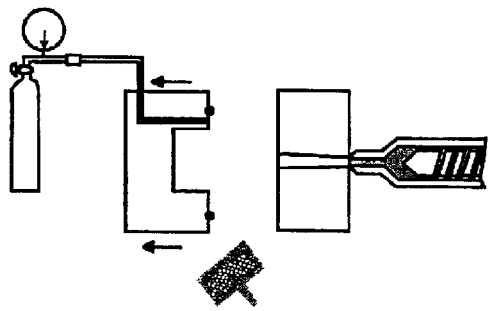

It has been surprisingly found that moulded polyurethane containing products that are manufactured using gas assisted injection moulding have significantly reduced demould times and the process can be carried out at lower temperatures, resulting in a better barrel stability. In addition, further density reduction is obtained while maintaining or improving the skin quality and demould time. The low density thermoplastic polyurethanes thus obtained (density not more than 800 $kg/m^3$) have a fine cell structure, a uniform density profile, very good surface appearance, a skin having uniform thickness and show comparable physical properties to conventional polyurethanes, which renders them suitable for a wide variety of applications.

Particularly, the TPU products prepared as described herein have outstanding low temperature dynamic flex properties and green strength at the time of demould, at density 800 $kg/m^3$ and below. The polymer skin of a moulded item, for example, a shoe sole and other moulded articles, should possess sufficient tensile strength and elongation and tear strength to survive a 90 to 180 degree bend without exhibiting surface cracks. The prior art processes often require 5 minutes minimum demould time to attain this characteristic, whereas demould times of 2 to 3 minutes are achievable with the present invention.

There is different equipment capable of pressurising a gas such that it may be injected into a moulding process. Examples are cited in EP 467 565 and EP 648 157. However, none of these have been successfully implemented for the manufacturing of moulded polyurethane, especially thermoplastic products.

Thermoplastic polyurethanes are obtained by reacting a difunctional isocyanate composition with at least one difunctional polyhydroxy compound and optionally a chain extender in such amounts that the isocyanate index is between 90 and 110, preferably between 95 and 105, and most preferably between 98 and 102. The term "difunctional" as used herein means that the average functionality of the isocyanate composition and the polyhydroxy compound is about 2. The term "isocyanate index" as used herein is the ratio of isocyanate-groups over isocyanate-reactive hydrogen atoms present in a formulation, given as a percentage. In other words, the isocyanate index expresses the percentage of isocyanate actually used in a formulation with respect to the amount of isocyanate theoretically required for reacting with the amount of isocyanate-reactive hydrogen used in a formulation. It should be observed that the isocyanate index as used herein is considered from the point of view of the actual polymer forming process involving the isocyanate ingredient and the isocyanate-reactive ingredients. Any isocyanate groups consumed in a preliminary step to produce modified polyisocyanates (including such isocyanate-derivatives referred to in the art as quasi- or semi-prepolymers) or any active hydrogens reacted with isocyanate to produce modified polyols or polyamines, are not taken into account in the calculation of the isocyanate index. Only the free isocyanate groups and the free isocyanate-reactive hydrogens present at the actual elastomer forming stage are taken into account.

The difunctional isocyanate composition may comprise any aliphatic, cycloaliphatic, or aromatic isocyanates. Preferred are isocyanate compositions comprising aromatic diisocyanates, and more preferably diphenylmethane diisocyanates. In preferred embodiments, the difunctional isocyanate composition used in the process of the present invention may consist essentially of pure 4,4'-diphenylmethane diisocyanate or mixtures of that diisocyanate with one or more other organic polyisocyanates, especially other diphenylmethane diisocyanates, for example the 2,4'-isomer optionally in conjunction with the 2,2'-isomer. The difunctional isocyanate component may also be an MDI variant derived from a polyisocyanate composition containing at least 95% by weight of 4,4'-diphenylmethane diisocyanate. MDI variants are well known in the art and, for use in accordance with the invention, particularly include liquid products obtained by introducing carbodiimide groups into said polyisocyanate composition and/or by reacting with one or more polyols. Preferred difunctional isocyanate compositions are those containing at least 80% by weight of 4,4'-diphenylmethane diisocyanate. More preferably, the 4,4'-diphenyhmethane diisocyanate content is at least 90, and most preferably at least 95% by weight.

The difunctional polyhydroxy compound should have a molecular weight of between 500 and 20,000, and may be selected from polyesteramides, polythioethers, polycarbonates, polyacetals, polyolefins, polysiloxanes, polybutadienes and, especially, polyesters and polyethers, or mixtures thereof Other dihydroxy compounds such as hydroxyl-ended styrene block copolymers like SBS, SIS, SEBS or SIBS may be used as well.

Mixtures of two or more compounds of such or other functionalities and in such ratios that the average functionality of the total composition is about 2 may also be used as the difunctional polyhydroxy compound. For polyhydroxy compounds, the actual functionality may be somewhat less than the average functionality of the initiator due to some terminal unsaturation. Therefore, small amounts of trifunctional polyhydroxy compounds may be present as well in order to achieve the desired average functionality of the composition.

Polyether diols that may be used include products obtained by the polymerization of a cyclic oxide, for example ethylene oxide, propylene oxide, butylene oxide or tetrahydrofuran in the presence, where necessary, of difunctional initiators. Suitable initiator compounds contain two active hydrogen atoms and include water, butanediol, ethylene glycol, propylene glycol, diethylene glycol, triethylene glycol, dipropylene glycol, 1,3-propane diol, neopentyl glycol, 1,4-butanediol, 1,5-pentanediol, 1,6-pentanediol and the like. Mixtures of initiators and/or cyclic oxides may be used.

Especially useful polyether diols include polyoxypropylene diols and poly(oxyethylene-oxypropylene) diols obtained by the simultaneous or sequential addition of ethylene or propylene oxides to difunctional initiators as fully described in the prior art. Random copolymers having oxyethylene contents of 10–80%, block copolymers having oxyethylene contents of up to 25% and random/block copolymers having oxyethylene contents of up to 50%, based on the total weight of oxyalkylene units, may be mentioned, in particular those having at least part of the oxyethylene groups at the end of the polymer chain. Other useful polyether diols include polytetramethylene diols obtained by the polymerisation of tetrahydrofuran. Also suitable are polyether diols containing low unsaturation levels (i.e. less than 0.1 milliequivalents per gram diol).

Other diols that may be used comprise dispersions or solutions of addition or condensation polymers in diols of the types described above. Such modified diols, often referred to as 'polymer' diols have been fully described in the prior art and include products obtained by the in situ polymerisation of one or more vinyl monomers, for example styrene and acrylonitrile, in polymeric diols, for example polyether diols, or by the in situ reaction between a polyisocyanate and an amino- and/or hydroxyfunctional compound, such as triethanolamine, in a polymeric diol.

Polyoxyalkylene diols containing from 5 to 50% of dispersed polymer are useful as well. Particle sizes of the dispersed polymer of less than 50 microns are preferred.

Polyester diols that may be used include hydroxyl-terminated reaction products of dihydric alcohols such as ethylene glycol, propylene glycol, diethylene glycol, 1,4-butanediol, neopentyl glycol, 2-methylpropanediol, 3-methylpentane-1,5-diol, 1,6-hexanediol or cyclohexane dimethanol or mixtures of such dihydric alcohols, and dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof.

Polyesteramides may be obtained by the inclusion of aminoalcohols such as ethanolamine in polyesterification mixtures.

Polythioether diols which may be used include products obtained by condensing thiodiglycol either alone or with other glycols, alkylene oxides, dicarboxylic acids, formaldehyde, amino-alcohols or aminocarboxylic acids.

Polycarbonate diols which may be used include those prepared by reacting glycols such as diethylene glycol, triethylene glycol or hexanediol with formaldehyde. Suitable polyacetals may also be prepared by polymerising cyclic acetals.

Suitable polyolefin diols include hydroxy-terminated butadiene homo- and copolymers and suitable polysiloxane diols include polydimethylsiloxane diols.

Suitable difunctional chain extenders include aliphatic diols, such as ethylene glycl, 1,3-propanediol, 1,4-butanediol, 1,5-pentanediol, 1,6-hexanediol, 1,2-propanediol, 2-methylpropanediol, 1,3-butanediol, 2,3-butanediol, 1,3-pentanediol, 1,2-hexanediol, 3-methylpentane-1,5-diol, diethylene glycol, dipropylene glycol and tripropylene glycol, and aminoalcohols such as ethanolamine, N-methyldiethanolamine and the like. 1,4-butanediol is preferred.

TPUs suitable for processing according to the invention can be produced in the so-called one-shot, semi-prepolymer, or prepolymer method by casting, extrusion, or any other process known to the person skilled in the art and are generally supplied as granules or pellets.

Optionally, small amounts, i.e. up to 30, preferably 20 and most preferably 10, wt % based on the total of the blend, of other conventional thermoplastic elastomers such as PVC, EVA or TR may be blended with the TPU.

The gas injection process and equipment may contain one or more of the following embodiments. The gas used can be a mixture. The gas injection can be used to assist mixing or flow external to a mould. The gas injection can be applied to reaction injection moulding herein after referred to as "GARIM". The injection unit can be used to supply one of or simultaneously all of: counter pressure; gas assisted injection; and physical foam blowing. The gas injection can be fed into the chemical/polymer processing equipment (i.e. into the barrel of an extruder, feeds of a reaction injection moulding unit, or a polyurethane mix head). This can either be designed for 'one bubble' formation, or be a method of introducing physical blowing agent into a polymer melt. An in-line-mixing device can be used after the gas injection point.

The moulding process may contain one or more of the following embodiments. The gas injection can be into a tube, inserted into a mould cavity. This tube can either remain in the mould or be retracted. The gas via the inlet 'tube' or gas injection nozzle (or tube) can be temperature controlled, either hotter or cooler in order to influence the skin thickness, solidification or cure rates, or even prevent a skin forming. A solid cooled (or cured) 'tube' of injected material could be deliberately formed around the gas injection point. A gas 'counter pressure' and a gas injection can be used together, allowing full control of the onset and progression of bubble growth in a foaming material.

Surprisingly, it has been found that the foaming of TPU with counter-pressure showed a more uniform density profile and fine cell structure with equal physical properties to conventional TPU along the path of the melt flow as compared with the parts produced under similar conditions without any counter pressure. Typically, the foaming of TPU is done with a blowing agent or expandable microspheres or a combination thereof. Gas injection can be into a balloon, disposable or reusable and either remaining in the moulded component or withdrawn. Both GAIM and GARIM can be used to enable 'inward foaming'. Initially the injected material is prevented from foaming while a bubble is formed in the center. Once the pressure from the center bubble is removed the material can then foam 'inwards'. The gas injection can be done between the surface of a moulded component and the mould wall to aid release. The gas injection port can be used to apply another material into a mould before injection takes place (i.e. mould coating, paint or mould release could be 'sprayed' in). The gas injection can be used with composite moulded applications (e.g. SRIM) to reduce surface defects (bubbles, inclusions, poor wet-out) by aiding the flow of the chemicals through the reinforcing material and assisting in the displacement of trapped gas. For a particular mould design, and while maintaining an equivalent product quality, injection can be used to allow the use of higher viscosity materials, higher molecular weight materials, lower melt temperatures, thereby operating at a temperature further removed from the decomposition temperatures and lower mould temperatures. The gas injection can be used to form layers on a mould to form laminates (i.e. a thin aliphatic coating followed by a blown thermoplastic polyurethane material). The number of injection points/gates may be reduced compared to commercially available equipment for the injection of gas. The runner waste by blowing through the runner space may be reduced. The injected gas/liquid/etc can be varied in temperature to provide heating/cooling to the component being made. Different ratios of conventional blowing agents and gas assistance can be used. The endotherm or exotherm produced by the conventional blowing agents may be counteracted or assisted by varying the gas injection temperature.

The polymer can also contain expandable microspheres. Any expandable, preferably thermally expandable microspheres can be used in the present invention. However, microspheres containing hydrocarbons, in particular aliphatic or cycloaliphatic hydrocarbons, are preferred. The term "hydrocarbon" as used herein is intended to include non-halogenated and partially or fully halogenated hydrocarbons.

Thermally expandable microspheres containing a (cyclo) aliphatic hydrocarbon, which are particularly preferred in the present invention, are commercially available. These include expanded and unexpanded microspheres. Preferred microspheres are unexpanded or partially unexpanded microspheres consisting of small spherical particles with an average diameter of typically 10 to 15 micron. The sphere is formed of a gas proof polymeric shell (consisting e.g. of acrylonitrile or PVDC), encapsulating a minute drop of a (cyclo)aliphatic hydrocarbon, e.g. liquid isobutane. When these microspheres are subjected to heat at an elevated temperature level (e.g. 150° C. to 200° C.) sufficient to soften the thermoplastic shell and to volatilize the (cyclo) aliphatic hydrocarbon encapsulated therein, the resultant gas expands the shell and increases the volume of the microspheres. When expanded, the microspheres have a diameter 3.5 to 4 times their original diameter as a consequence of which their expanded volume is about 50 to 60 times greater than their initial volume in the unexpanded state. An example of such microspheres are the EXPANCEL-DU microspheres which are marketed by AKZO Nobel Industries of Sweden (EXPANCEL is a trademark of AKZO Nobel Industries).

According to one embodiment of the present invention, it has now been surprisingly found that the presence of dissolved gases, most commonly carbon dioxide and nitrogen, in the polymer melt can be used to modify the melting range and the rheological properties of the thermoplastic polyurethane to improve the effectiveness of the expandable microspheres. The gas can be introduced to the polymer melt by a number of means:

- As a gas injected under pressure, from 50 to 150 bar into the melt processing machine. For injection moulding the gas can be injected into the barrel, the nozzle or directly into the mould cavity. The preference is to inject the gas into the barrel of the moulding machine and using a mixing device to homogenize the resultant melt. The pressures experienced by the melt in the barrel of the moulding machine keep the gas in solution.
- As a supercritical liquid injected directly into the melt processing machine. Again for injection moulding this gas can be injected into the barrel of the injection moulding machine and a mixing device used to ensure the dissolved gas is fully dispersed in the melt. The pressures experienced by the melt in the processing machine keep the gas in solution.
- Via a chemical blowing agent, which releases gas at elevated temperature, such blowing agents are of the sodium bicarbonate/citric acid type, which releases carbon dioxide, or azo dicarbonamide type, which releases nitrogen. Here the melting range of the polymer and its rheology is affected by the presence of the chemical blowing agent and the resultant gases. The chemical blowing agents are usually in a solid form and are added to the melt processing machine with the polymer.

In a preferred embodiment, a blowing agent is added to the system, which may either be an exothermic or endothermic blowing agent, or a combination of both. Most preferably however, an endothermic blowing agent is added. Any known blowing agent used in the preparation of foamed thermoplastics may be used in the present invention as blowing agents. Examples of suitable chemical blowing agents include gaseous compounds such as nitrogen or carbon dioxide, gas (e.g. $CO_2$) forming compounds such as azodicarbonamides, carbonates, bicarbonates, citrates, nitrates, borohydrides, carbides such as alkaline earth and alkali metal carbonates and bicarbonates e.g. sodium bicarbonate and sodium carbonate, ammonium carbonate, diaminodiphenylsulphone, hydrazides, malonic acid, citric acid, sodium monocitrate, ureas, azodicarbonic methyl ester, diazabicylooctane and acid/carbonate mixtures. Preferred endothermic blowing agents comprise bicarbonates or citrates. Examples of suitable physical blowing agents include volatile liquids such as chlorofluorocarbons, partially halogenated hydrocarbons or non-halogenated hydrocarbons like propane, n-butane, isobutane, n-pentane, isopentane and/or neopentane. Preferred endothermic blowing agents are the so-called HYDROCEROL blowing agents, as disclosed in EP-A 158212 and EP-A 211250, which are known as such and commercially available (HYDROCEROL is a trademark of Clariant). Azodicarbonamide type blowing agents are preferred as exothermic blowing agents.

Microspheres are usually used in amount of from 0.1 to 5.0 parts by weight per 100 parts by weight of thermoplastic polyurethane. From 0.5 to 4.0 parts by weight per 100 parts by weight of thermoplastic polyurethane of microspheres are preferred. Most preferably, microspheres are added in amounts from 1.0 to 4.0 parts by weight per 100 parts by weight of thermoplastic polyurethane.

The total amount of blowing agent added is usually from 0.1 to 5.0 parts by weight per 100 parts by weight of thermoplastic polyurethane. Preferably, from 0.5 to 4.0 parts by weight per 100 parts by weight of thermoplastic polyurethane of blowing agent is added. Most preferably, blowing agent is added in amounts from 1.0 to 3.0 parts by weight per 100 parts by weight of thermoplastic polyurethane.

Additives which are conventionally used in thermoplastics processing may also be used in the process of the present invention. Such additives include catalysts, for example tertiary amines and tin compounds, surface-active agents and foam stabilisers, for example siloxane-oxyalkylene copolymers, flame retardants, antistatic agents, flow aids, organic and inorganic fillers, pigments and internal mould release agents.

The foamed thermoplastic polyurethanes obtainable via the process of the present invention are particularly suitable for use in any application of thermoplastic rubbers including, for example, footwear or integral skin applications, such as steering wheels.

Customized thermoplastic polyurethanes may be produced more efficiently using the process according to the present invention. The customized thermoplastic polyurethanes may be formed into any of the articles generally made with thermoplastic resins. Examples of articles are interior and exterior parts of automobiles, such as inside panels, bumpers, housing of electric devices such as television, personal computers, telephones, video cameras, watches, note-book personal computers; packaging materials; leisure goods; sporting goods and toys.

Different type of products may be produced from using gas assisted injection moulding. The gas injection can be used to vary the onset and point of foaming to vary the orientation of cells within the component. Similarly, the density distribution may be varied. Gas injection can be used with foam-in-place, such as fabric coating or mould inserts, to improve the penetration or adhesion achieved. Gas pressures (and/or mould temperatures) may be varied to control skin thickness and surface definition. Gas injection can be used to form a hollow foamed component. A component with a combination of open and closed cell foam can be produced. A hollow component can be formed and then foam is injected into a bag in the hollow.

EXAMPLE

The invention is illustrated, but not limited by the following example. The example describes the foaming of TPU using chemical blowing agent and the high-pressure process with gas counter-pressure. All experiments were performed using a customary 80-ton injection moulding machine from Demag Ergotech. A special mould was designed and manufactured to perform the counter-pressure process. The cavity of the custom made mould is sealed so that it can maintain a constant counter-pressure when the mould is closed. The mould used for the experiments is a one-cavity mould with two changeable inserts and a bar gate. The produced part is a disc of 115 mm diameter and, depending on the insert, of 8 mm or 4 mm thickness. The gas unit was a customary machine usually used for GAIM (gas assisted injection moulding) from MAXIMATOR. The gas used for the counter-pressure was nitrogen $N_2$). FIG. 1 shows the steps of an injection moulding cycle using the counter-pressure process. The counter-pressure is being built up, as soon as the mould is closed. The injection of the polymer/gas melt is started after the counter-pressure is set in the cavity. The cavity is partly filled while maintaining a constant counter-pressure. The intent of the counter-pressure is to inhibit premature foaming and to keep the gas in solution. After the injection phase, the pressure is reduced to environment pressure. The polymer melts in the cavity, expands, and the cavity is filled to 100%.

The foamed TPU parts produced with counter pressure showed a more uniform density profile and firm cell structure with equal physical properties to conventional foamed TPU along the path of the melt flow as compared with the parts produced under similar conditions without any counter pressure.

What is claimed is:

1. A process for making moulded thermoplastic polyurethane products having a density of at most 800 k/m$^3$ characterized by using gas assisted injection moulding, whereby gas counter pressure is being used together with the gas assisted injection moulding and whereby polymer for making the moulded thermoplastic polyurethane products contains expandable microspheres.

2. The process of claim 1, whereby a blowing agent is present.

3. The process of claim 2, wherein the amount of blowing agent is between 0.5 and 4.0 parts by weight per 100 parts by weight of thermoplastic polyurethane.

4. The process of claim 1, wherein the amount of microspheres is between 1.0 and 4.0 parts by weight per 100 parts by weight of thermoplastic polyurethane.

5. The process of claim 1, wherein the gas used for counter pressure is nitrogen or carbon dioxide.

6. The process of claim 1, whereby said microspheres are thermally expandable.

7. The process of claim 2, wherein the amount of microspheres is between 1.0 and 4.0 parts by weight per 100 parts by weight of thermoplastic polyurethane.

8. The process of claim 2, wherein the gas used for counter pressure is nitrogen or carbon dioxide.

9. The process of claim 2, whereby said microspheres are thermally expandable.

* * * * *